Dec. 10, 1929.  J. W. BRENKERT ET AL  1,738,941
LIGHT PROJECTING MACHINE
Filed Feb. 15, 1926  3 Sheets-Sheet 1
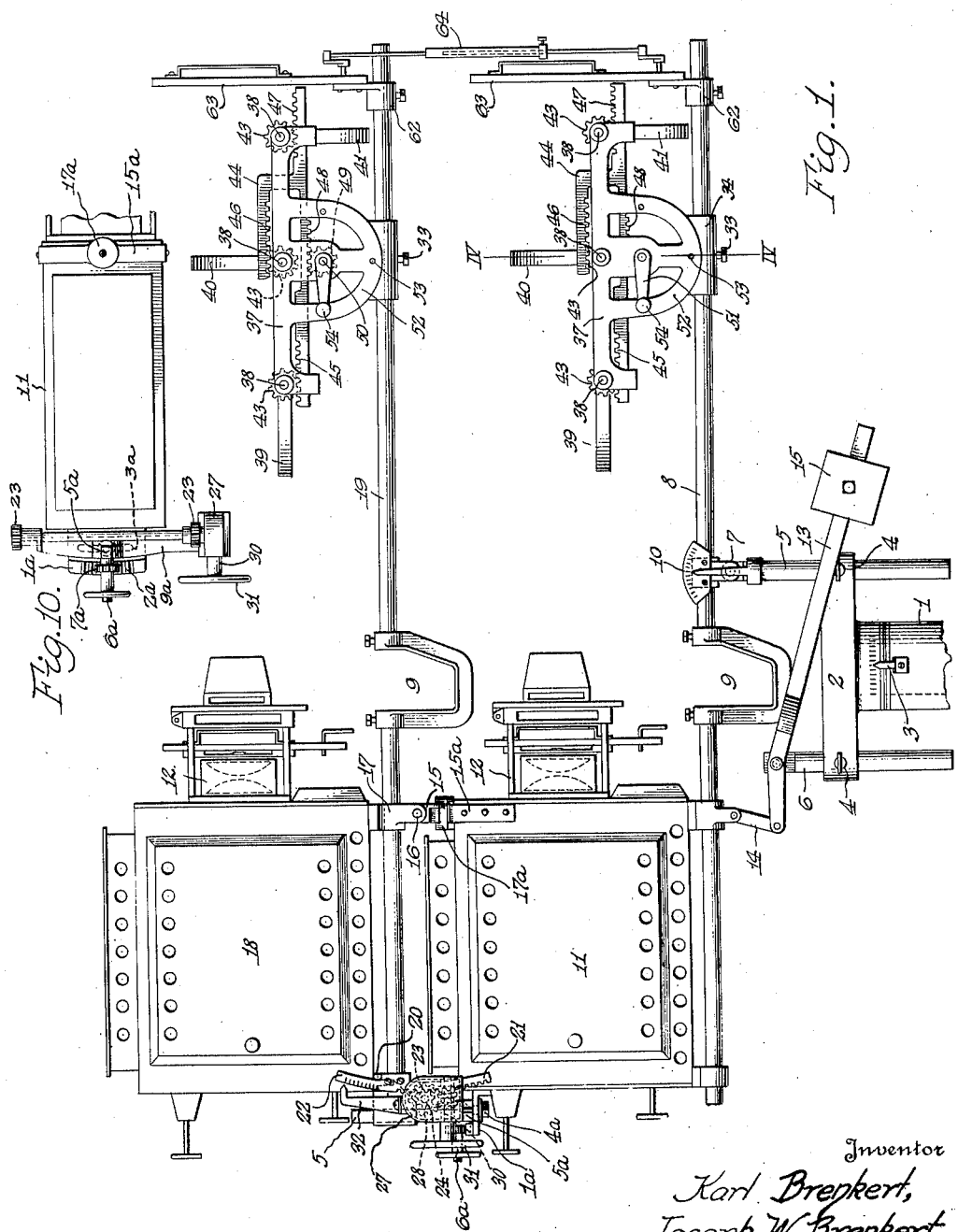
Inventor
Karl Brenkert,
Joseph W. Brenkert,
By
Attorneys

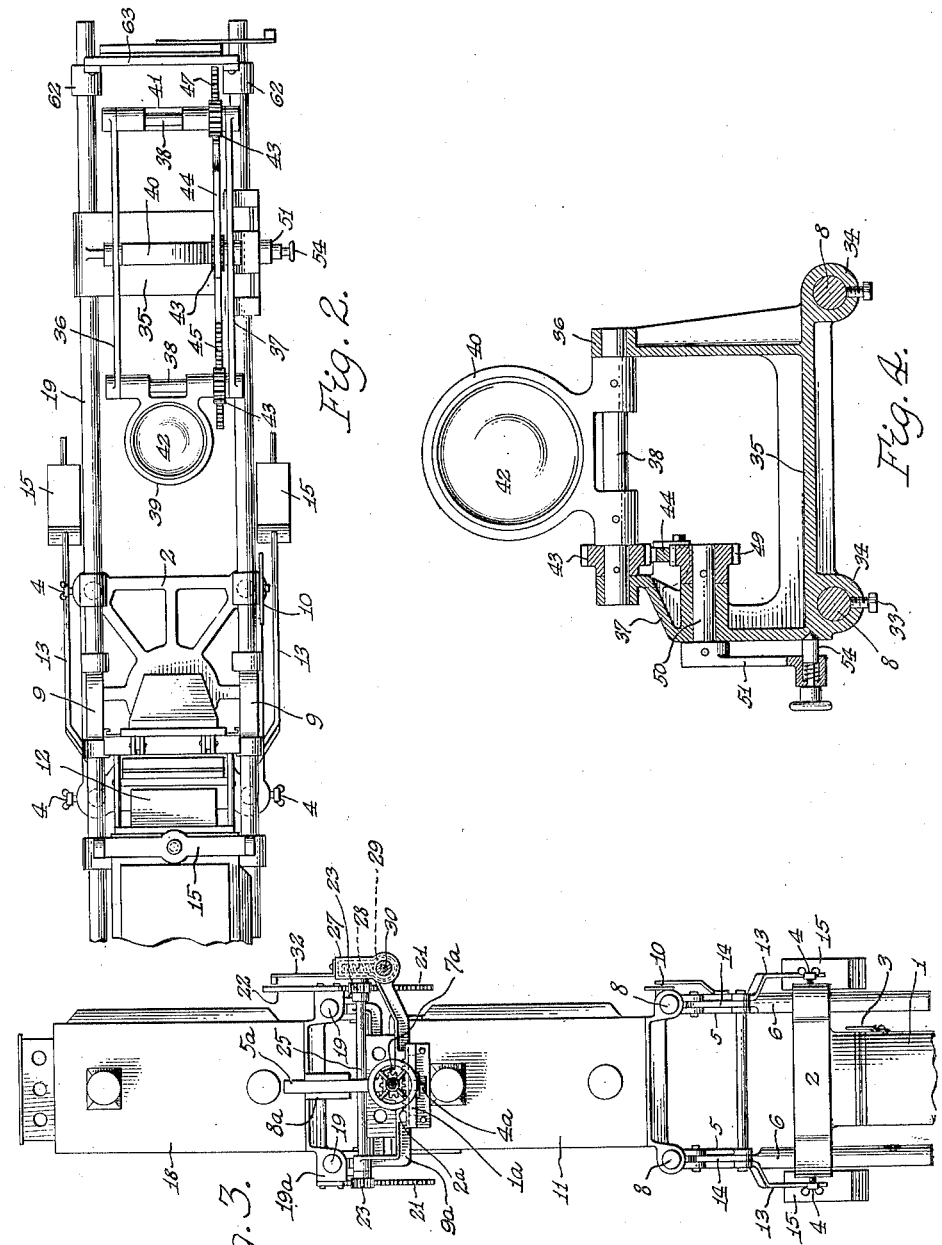

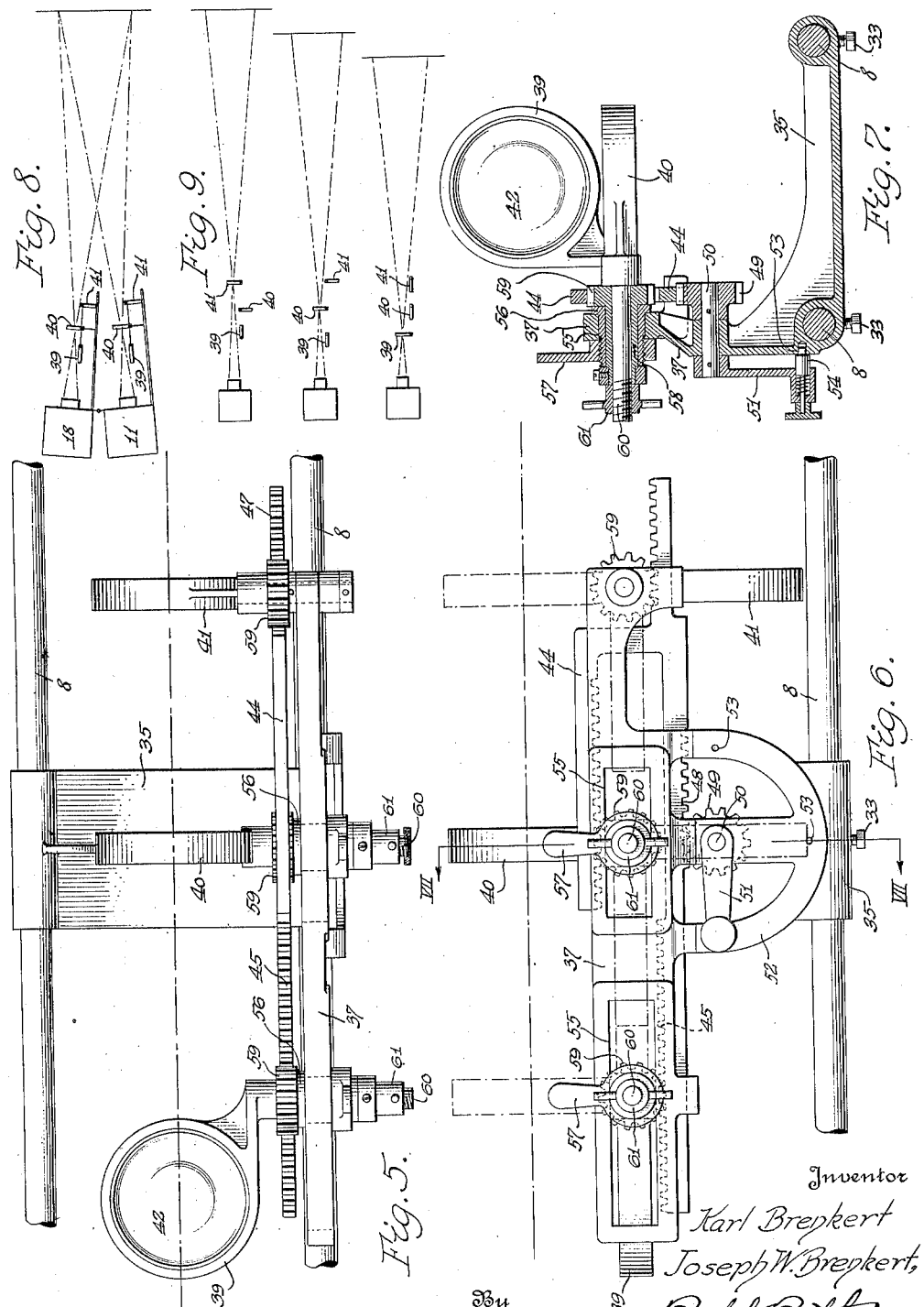

Patented Dec. 10, 1929

1,738,941

UNITED STATES PATENT OFFICE

JOSEPH W. BRENKERT AND KARL BRENKERT, OF HIGHLAND PARK, MICHIGAN

LIGHT-PROJECTING MACHINE

Application filed February 15, 1926. Serial No. 88,372.

This invention relates to combined light projectors adapted for theater or stage lighting, the projecting machine including structures for combined slide effect and flood lighting. In this type of light projecting machine it is a common practice to provide various kinds of lenses to obtain desired degrees of light projection and illumination, and in some instances one or more lenses are used which necessitate adjustment of the lenses relative to a source of light to obtain the desired degree of light projection. Again, such projecting machines include lamp housings in superposed relation and ordinarily balanced for universal movement, and it is in connection with these machines that we have made various improvements.

First, we provide novel lens holders for various degrees of light projection and these lens holders are constructively arranged so that adjustment of one lens holder causes the other lens holders to be actuated, whereby a lens holder is at all times in the path of light projection. A bracket is employed for supporting the lens holders and under ordinary circumstances the bracket is stationary thus obviating the necessity of longitudinally shifting a lens relative to a source of light.

Second, we provide a multiple lens holder in which the lenses are adjustable in synchronism but provision is made for individual lens adjustment.

Third, the machine includes superposed lamp housings with the upper housing mounted for a tilting and lateral swinging action relative to the lower housing, and simple and effective means are p ovided for adjusting the upper housing so that the projection of light from the lamp housings may be for matched, overlapped or individual illumination. Is is by virtue of such adjust- ment that large areas may be intensely illuminated or areas separately illuminated.

Fourth, our invention includes certain novel refinements in light projecting machines, which together with other features of our invention will be hereinafter specifically described and then claimed.

Reference will now be had to the drawings, wherein

Figure 1 is a side elevation of a light projecting machine in accordance with our invention;

Fig. 2 is a plan of a portion of the same;

Fig. 3 is a rear elevation of the machine;

Fig. 4 is an enlarged cross secional view taken on the line IV—IV of Fig. 1;

Fig. 5 is an enlarged plan of a portion of the machine showing individual adjustable lens holders;

Fig. 6 is a side elevation of the same;

Fig. 7 is a cross sectional view taken on the line VII—VII of Fig. 6, but showing the middle lens holder in an inactive position and an end lens holder in an active position;

Fig. 8 is a diagrammatic view of the lamp housings adjusted for a matched illumination;

Fig. 9 shows diagrammatically the different lens adjustments for obtaining illumination at desired distance; and Fig. 10 is a plan view with the upper lamp housing removed.

In the drawings, the reference numeral 1 denotes a pedestal provided with a rotatable horizontally disposed head 2 and a conventional form of indicator 3 will show the degrees of rotation of said head.

Adjustable in the head 2 and adapted to be fixed relative to said head by set screws 4 or other fastening means are sets of vertical supports 5 and 6. Pivotally connected to the upper ends of the supports 5, as at 7, is a lower frame composed of parallel rods 8 provided with a gap or well 9 to provide clearance for attachments adapted to be used in connection with the light projecting machine. The lower frame 8 is tiltable relative to the horizontal adjustable head 2 and the degree of tilting relative to the perpendicular may be ascertained at an indicator or gauge 10 adjacent the pivot 7 of the lower frame.

Mounted on the rear end of the lower frame 8 is a lower lamp housing 11 containing a suitable source of light and provided with a conventional form of lens, slide or scenic effect housing 12.

As a counterbalance for the lower frame 8 and such structures as are supported from the frame, there are weighted arms 13 pivotally connected to the upper ends of the supports 6 and connected by links 14 to the forward end of the lower lamp housing 11. The arms 13 are provided with adjustable weights 15 which may be positioned to properly counterbalance the tiltable frame 8 as it is shifted relative to the rotary head 2.

The upper part of the lower lamp housing 11, at its forward end, is provided with a transversely disposed bracket 15a and centrally of said bracket are pivot members 17a supporting a bracket 15 to which are pivotally connected, as at 16, the support 17 of an upper lamp housing 18. It is by virtue of the pivot members 17a that the lamp housing 18 may be laterally swung in addition to the tilting action of the support 17 on the bracket 15. The supports 17 are provided with a frame 19 similar to the frame 8 and a novel mechanism is employed at the inner ends of the frames 19 and the housing 11 and 18 for vertically tilting and laterally shifting the upper lamp housing 18 relative to the lower lamp housing.

On the inner end of the lamp housing 11, adjacent the top thereof, is a rack bracket 1a having a rack 2a. The bracket 1a, as best shown in Fig. 10, has an arcuated slot 3a and slidable in said slot is the holding screw 4a of an upright 5a. Journaled in the lower end of this upright is a hand wheel shaft 6a provided with a pinion 7a meshing with the rack 2a.

The upright 5a is also carried by a transverse bearing frame 9a slidable on the bracket 1a and said bearing frame supports a transverse shaft 25 provided with pinions 23 meshing with racks 21. The racks 21 are attached to a supporting frame 19a for the inner end of the upper housing 18 and the supports 19 extending into the supporting frame 19a, as best shown in Fig. 3. One of the racks 21 has a graduated extension 22 movable relative to a pointer 32 on a gear housing 27 supported by one end of the transverse bearing frame 9a. In the gear housing 27 is a worm wheel 28 on the end of the shaft 25, said worm wheel meshing with a worm 29 on a shaft 30 journaled in the housing 27 and provided with a hand wheel 31. By rotating the hand wheel 31 the inner end of the lamp housing 18 may be raised and lowered relative to the inner end of the lower lamp housing 11, and as shown in Fig. 8 the frames 1 and 19 may be placed at an angle relative to each other, so that matched overlapping or separate illumination is obtainable from the superposed lamp housings 11 and 18.

The upright 5a extends between guides 8a of the supporting frame 19a, as best shown in Fig. 3, and through the medium of the rack 2a and pinions 7a the bearing frame 9a may be laterally shifted relative to the lower housing 11 so that the upper housing 18 turns on the pivot members 17a. This lateral swinging movement of the upper housing 18 relative to the lower housing is accomplished independent of any adjustment of the tilting mechanism between the upper housing 18 and the supporting frame 9a.

The frames 8 and 19 have individual focus devices and as these devices are identical in construction, we deem it only necessary to specifically describe one of the devices and then consider their joint use.

Slidably mounted on each frame, but adapted to be fixed against accidental movement by set screws 33 are elongated bearings 34 of a bracket 35 provided with three sets of opposed bearings 36 and 37 and journaled in each set of bearings is a transversely disposed shaft 38. On each shaft is a lens holder and these lens holders have been designated 39, 40 and 41. Each lens holder has a lens 42 for projecting light a desired distance, and by reference to Fig. 1, it will be noted that the lens holders are adapted to be placed in the path of light projected from the lamp housing. The lens holder 39 is mounted on its shaft at a right angle to the mounting of the lens holder 40 on its shaft, and the lens holder 41 is mounted at a right angle to the lens holder 39. This arrangement is essential, as will hereinafter appear, in order that a lens holder may be at all times in focus with its source of light for projecting the light a desired distance.

The shafts 38, adjacent the bearings 37, are provided with pinions 43 and slidably supported from the bearings 37 is a rack frame 44 having racks 45, 46, 47 and 48. The rack 45 meshes with the lower side of the pinion 43 of the lens holder 39; the rack 46 meshes with the upper side of the pinion 43 of the lens holder 40; the rack 47 meshes with the under side of the pinion 43 of the lens holder 41, and the rack 48 meshes with a pinion 49 mounted on a shaft 50, journaled in the bearing 37. The outer end of the shaft 50 has a crank 51 swingable relative to a segment shaped portion 52 of the bearing 37 and this segment shaped portion 52 is notched, as at 53, to receive a positioning spring pressed and manually retracted detent 54 carried by the crank 51.

As shown in Fig. 1, the lens holder 40 is in an active position and the lens holders 39 and 41 in inactive positions, but either in condition to be swung to an active position. By swinging the crank 51 downwardly in a clockwise direction the rack frame 44 is shifted to the left, viewing Fig. 1, and the lens holder 39 is raised to an active position while the lens holder 40 is lowered to a horizontal inactive position. During this operation the lens holder 41 is brought to a horizontal position preparatory to assuming an active position, and if the crank 51 is swung upwardly in a counterclockwise direction, opposite the position shown in Fig. 1, the lens holder 41 will be brought to an active position; the lens holder 40 lowered to a vertical depending position, and the lens holder 39 brought to a horizontal position.

The position of the crank 51 will more or less indicate the lens holder in use and reference will now be had to Fig. 9, showing diagrammatically the advantage of using such swingable lens holders. The uppermost condition illustrated in Fig. 9, is that of the lens holder 41 projecting a luminous cone 42 to what may be considered the precise distance to be illuminated, for instance the back part of a stage. Should it be desired to illuminate the middle portion of the stage the lens holder 40 is brought into an active position and if the front part of the stage is to be illuminated the lens holder 39 is used. In all instances it is desirable that there be an intensity of light under proper focus conditions. This is particularly true in the projection of moving pictures where a varied program may necessitate the use of various drops or screens having different positions relative to a stage. It is a well known fact that pictures or other matter are often projected on the front curtain while the stage is being prepared for another part of the program and after the curtain is raised the picture is projected on a rear curtain or screen. Ordinarily changing from one screen to another necessitates readjustment of the focusing lens, and to obviate such adjustment and eliminate disadvantages incident thereto, we have provided for an instantaneous selection, at will, of a proper focusing lens. It is only a matter of swinging the crank 51 to obtain a desired projection under the best light intensity condition possible.

Reference will now be had to Figs. 5 and 7 inclusive illustrating a further refinement of our invention, wherein some of the lens holders are individually adjustable so that such lens holders may be set for a desired focus and especially with reference to another lens holder.

The bearing 37 is provided with longitudinal slots 55 and adjustable in said slots and adapted to be clamped in a fixed position relative to the bearing 37 are bushings 56 provided with clamping nuts 57. Journaled in the bushings 56 are the hub portions 58 of pinions 59 serving the same purpose as the pinions 43, and instead of the lens holders being mounted on shafts, said lens holders have stems 60 extending through the hubs 58 and clamped against the outer ends thereof by nuts 61, so that the lens holders are fixed relative to the pinions 59 and may be actuated as previously described.

The bracket 35 may be adjusted on its supporting frame with the lens holder 41 in an active position to obtain a desired projection relative to a screen. This adjustment having been made and the bracket 35 fixed relative to its frame, the lens holders 39 and 40 may be bodily set relative to the lens holder 41 so that there will be proper light projections for other distances than that utilizing the lens holder 41

The outer ends of the frames 8 and 19 may be provided with various kinds of attachments, for instance supports 62 for dissolving shutters 63 and the shutters may be connected by an extensible coupling member 64 so that the shutters may be operated in synchronism, for instance the closing of one shutter and the opening of the other. Such are examples of various kinds of devices that may be located on the outer ends of the frames, and we do not care to confine our invention to any details of construction other than set forth in the appended claims.

What we claim is:—

1. A light projecting machine comprising upper and lower frames, upper and lower lamp housings on the rear ends of said frames with the lower lamp housing between said frames, a pivotal connection between said lamp housings, and a scenic housing on each lamp housing with said frames formed with wells affording operative clearance for the scenic housings.

2. In a light projecting machine, upper and lower lamp housings, a tiltable and rotatable frame supporting said lamp housings, a horizontal swivel connection for the forward end of the upper lamp housing on the forward end of the lower lamp housing, and means connecting the rear ends of said lamp housings to facilitate horizontally of swinging the rear end of the upper lamp housing relative to the lower lamp housing.

3. A light projecting machine comprising superposed lamp housings, a universal connection between one end of each housing, and adjusting means between the remaining ends of said housings, said means including a bearing frame on the lower housing, a rack and pinion for laterally adjusting said bearing frame, and rack and pinion mechanism between said bearing frame and the upper housing adapted for tilting the upper housing relatively to the lower housing.

4. In a light projecting machine wherein a lower lamp housing and an upper lamp housing are supported and balanced for movement at will and, said upper lamp housing has its forward end mounted on the forward end of said lower lamp housing so that the upper lamp housing may be adjusted in vertical and lateral planes; means between the rear ends of said housings by which the upper housing may be tilted in a vertical plane relative to the lower housing, and means between the rear ends of said housings supporting the last mentioned means and adapted for bodily swinging the upper lamp housing sidewise relative to the lower lamp housing, the pivot for the sidewise movement of the upper lamp housing being below the pivot for the tilting movement of said upper lamp housing.

5. A light projecting machine comprising superposed lamp housings, a swivel mounting for the upper lamp housing so that said upper lamp housing may be swung in a horizontal plane relative to the lower lamp housing, adjusting means by which the upper lamp housing may be horizontally shifted on its swivel mounting, supporting means for said lamp housings, scenic housings carried by said upper and lower lamp housings, and a series of adjustable lenses disposed in front of each lamp housing with each series of lenses swingable about parallel axes.

6. A light projecting machine comprising superposed frames, lamp housings supported thereby, a swivel connection between said frames whereby one of said frames may be swung in a horizontal plane relative to the other frame, and scenic housings carried by said lamp housings, said frames having wells adjacent said scenic housings providing clearance for operating activities of said scenic housings.

In testimony whereof we affix our signatures.

JOSEPH W. BRENKERT.
KARL BRENKERT.